July 9, 1968        A. L. LEE        3,391,661

SYSTEM FOR TREATING AND TRANSPORTING WASTE MATERIAL

Filed June 20, 1966        4 Sheets-Sheet 1

INVENTOR.
ARTHUR L. LEE
BY Stanley J. Price Jr.
His ATTORNEY

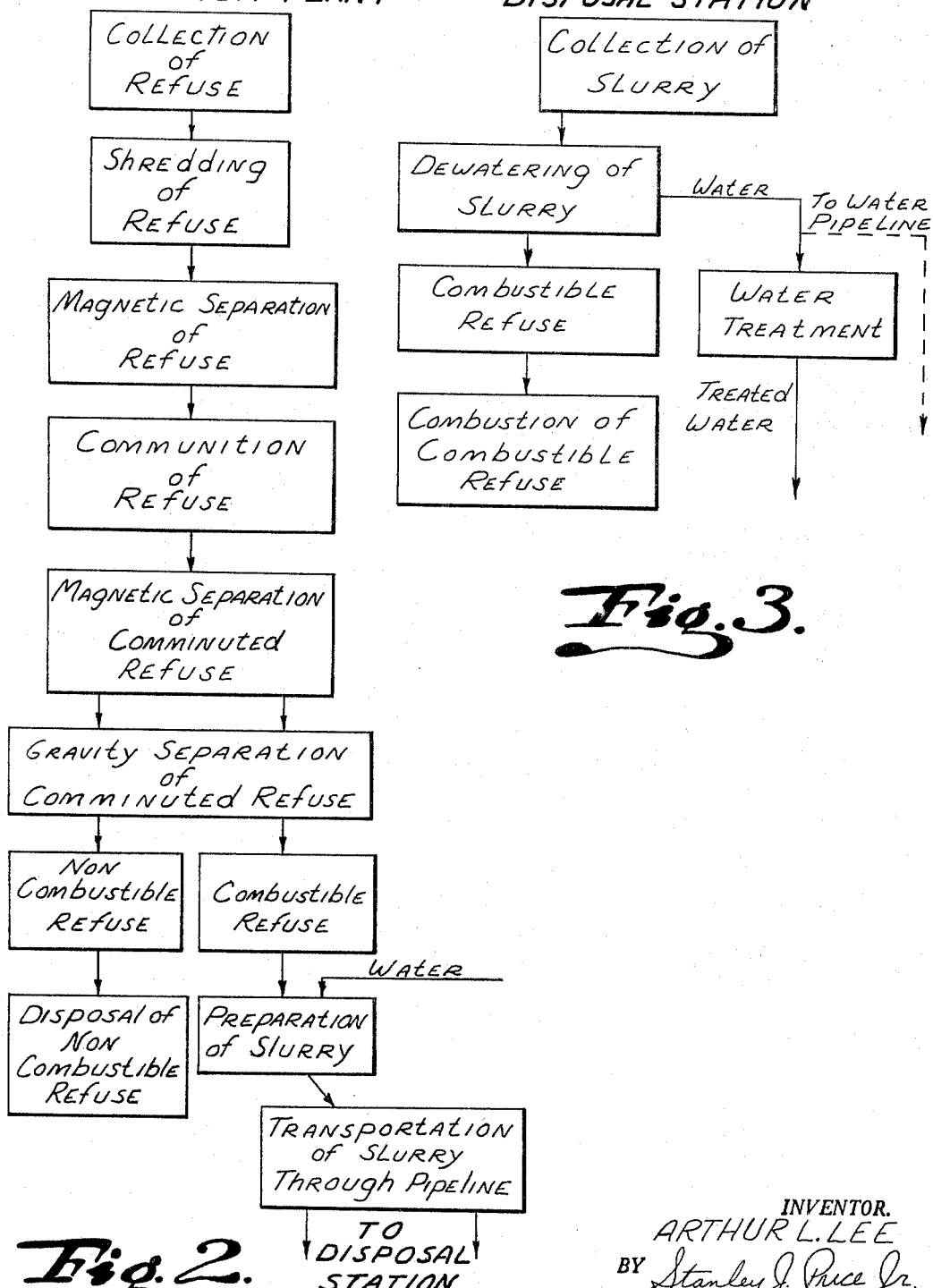

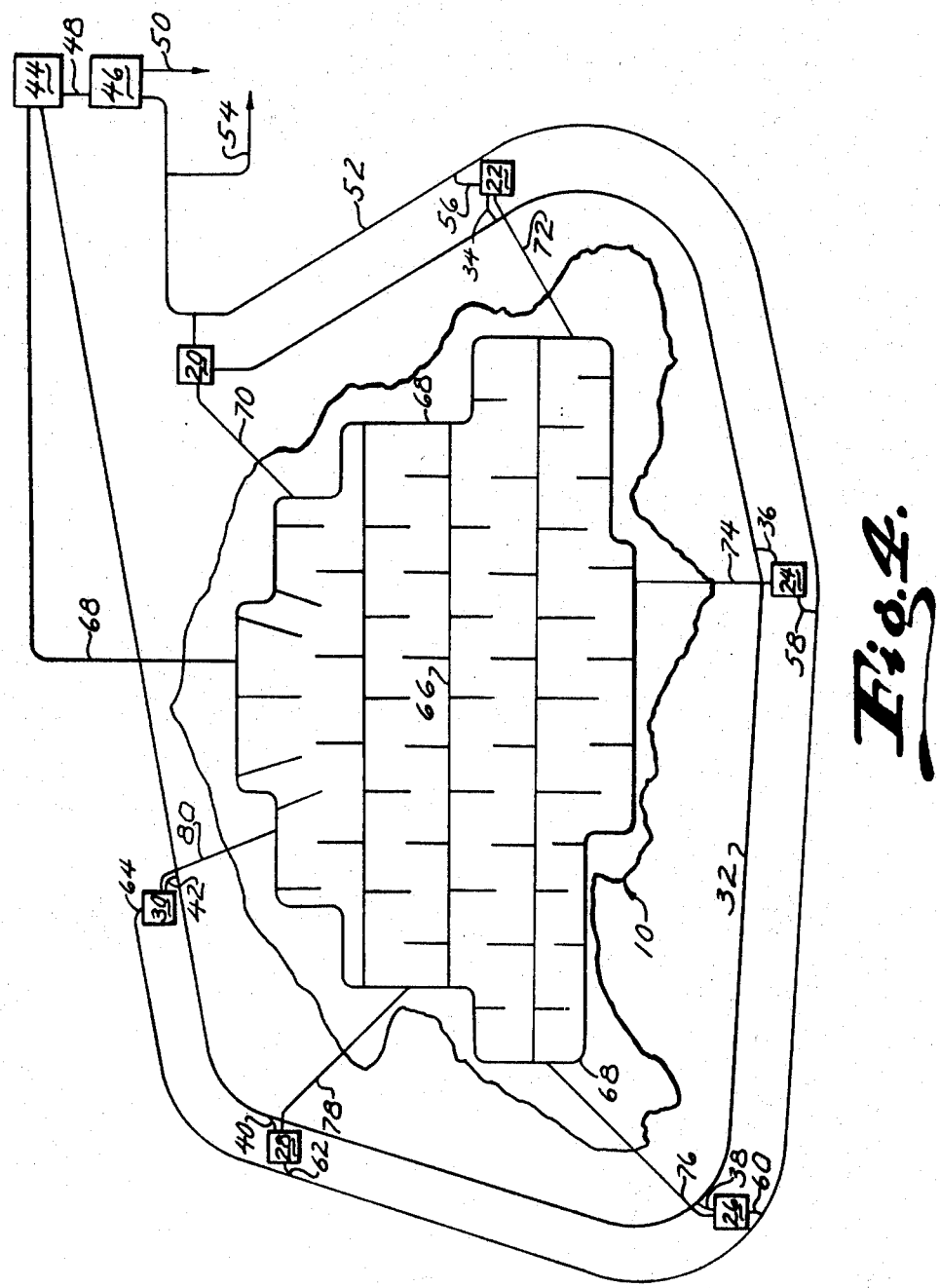

July 9, 1968     A. L. LEE     3,391,661
SYSTEM FOR TREATING AND TRANSPORTING WASTE MATERIAL
Filed June 20, 1966     4 Sheets-Sheet 4
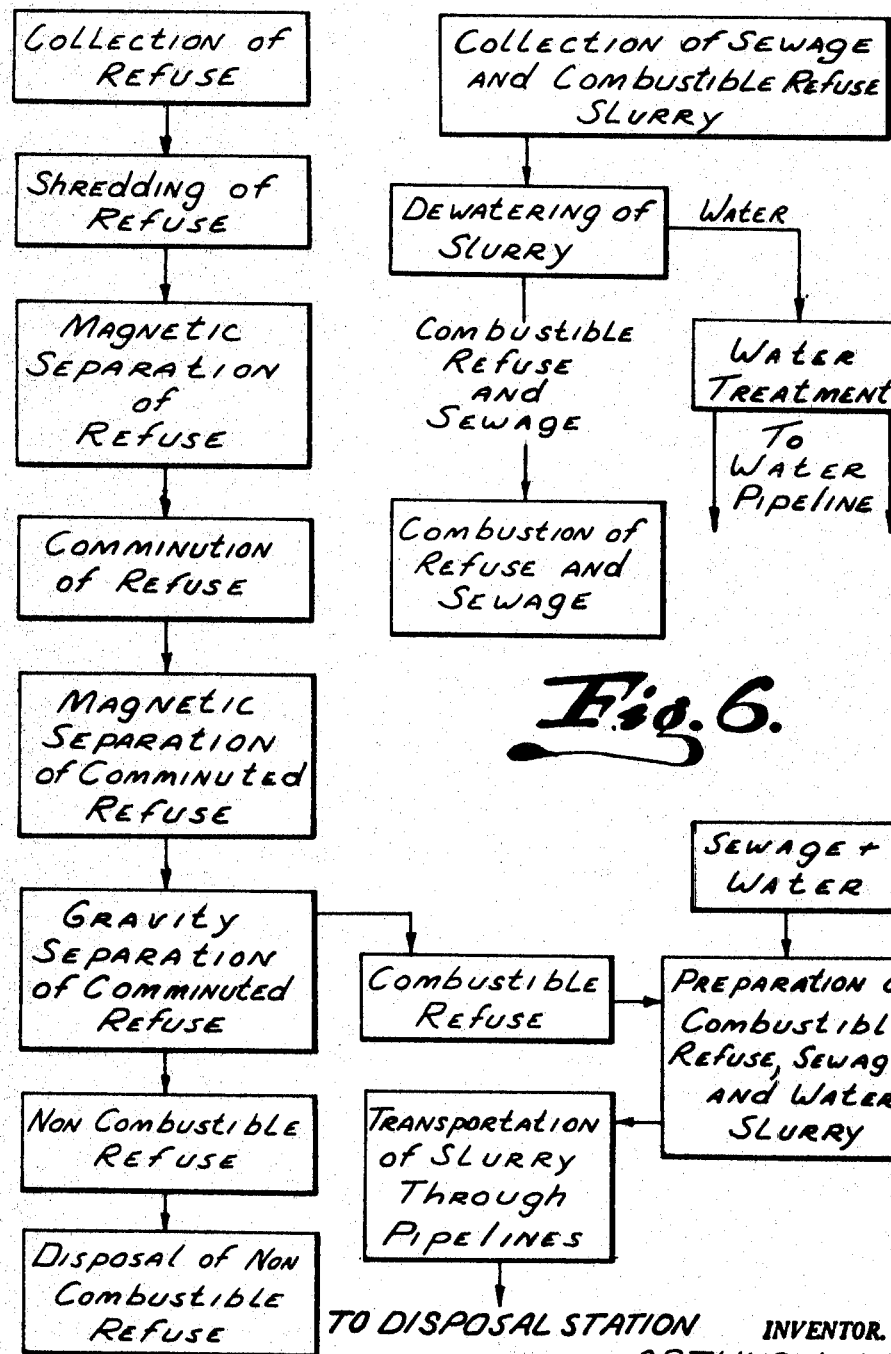
INVENTOR.
ARTHUR L. LEE
BY Stanley J. Price Jr.
His ATTORNEY

United States Patent Office 3,391,661
Patented July 9, 1968

3,391,661
SYSTEM FOR TREATING AND TRANSPORTING WASTE MATERIAL
Arthur L. Lee, Columbus, Ohio, assignor to Consolidation Coal Company, Pittsburgh, Pa., a corporation of Delaware
Filed June 20, 1966, Ser. No. 558,826
6 Claims. (Cl. 110—8)

ABSTRACT OF THE DISCLOSURE

A system for the disposal of waste material. The waste material is collected by conventional gathering vehicles and transported to one of a plurality of preparation stations. The waste material is comminuted and the magnetic constituents separated therefrom. The remaining waste material is subjected to gravity separation where the noncombustible inorganic constituents are separated from the combustible organic constituents. The comminuted combustible organic constituents are admixed with water to form a slurry and the slurry is thereafter pumped through a pipeline at a sufficient velocity to transport the comminuted combustible material through the pipeline to a disposal station. At the disposal station the slurry is dewatered and the combustible material burned.

---

This invention relates to a system for the disposal of waste material from residential, business, and industrial areas, and more particularly to a system of waste disposal wherein the combustible components of the waste material are separated from the noncombustible components at conveniently located preparation plants and the combustible components are thereafter transported as a slurry through a pipeline to remotely located disposal stations.

As used herein the term "waste or waste material" is intended to include both refuse and sewage. The term "sewage" includes human waste matter and similar material ordinarily collected in sewer systems of residential, business, or industrial areas. The term "refuse" is intended to designate waste material, other than sewage, that is material discarded from residential, business and industrial sources and is intended to include all of the materials now collected from business, residential and industrial sources by haulage vehicles, such as garbage, paper, wood, discarded furniture, used building materials and the like. This refuse is now usually burned in either private or municipal incinerators or disposed of in municipal dumping areas. The large municipally owned incinerators, because of the smoke and odor problems, are located in remote areas at substantial distances from the municipalities and the suburban areas. The same is true with the dumping areas where the refuse is deposited in prepared trenches or in naturally occurring ravines or the like. Because of the sanitation problems created at the local dumping area, local ordinances usually require the refuse in the dumping area to be treated chemically and layers of the treated refuse covered with layers of earth or other sanitary fill.

It is apparent in the presently practiced system of collecting and disposing of refuse that the vehicles employed to transport the refuse to the disposal areas or incinerators must travel substantial distances with each load. There is a need, therefore, for a system of rapidly and inexpensively disposing of the large volumes of refuse that accumulate daily in the large urban industrial areas and in the suburban residential areas.

The present invention contemplates a novel system for gathering, transporting and disposing of refuse. Briefly, the invention resides in a system of treating the refuse at conveniently located preparation plants to separate the non-combustible inorganic refuse from the combustible organic refuse. In the preparation plant the combustible refuse is comminuted to a desired size spectrum and admixed with a carrier liquid, such as water or the like, to form a slurry. The slurry is thereafter transported through an underground pipeline to a remotely located disposal station which may be a combustion installation, such as a conventional power plant for generating electricity or a combustion plant specifically designed to dispose of combustible waste material. At the disposal station the combustible refuse may be separated from the liquid carrier and burned in the combustion insulation. The combustible refuse either dried or as a concentrated slurry may also be admixed with carbonaceous fuel, such as coal, and burned in conventional steam boilers or other conventional apparatus. The water recovered at the disposal station may be treated and fed into adjoining streams or rivers or may be recycled to the preparation plants for reuse in transporting combustible refuse to the disposal station.

Another embodiment of the invention contemplates admixing the combustible refuse with the water and sewage collected in the sewage system and transporting the admixture of combustible refuse and sewage as a slurry through a sewage pipeline network to the sewage disposal station where the water carrier is separated from the admixture of refuse and sewage and the admixture burned in combustion apparatus.

The invention hereinafter described provides the advantage of more rapid, more efficient and less expensive waste collection in that the haulage distance by haulage vehicle for the collected waste is reduced substantially and the maximum haulage distance is no greater than the distance between the geographical center of the waste collection area and the nearest refuse preparation plant located either within the municipality or on the perimeter of the collection area. This invention has the additional advantage of eliminating unsanitary refuse dumps containing decaying organic matter that creates hazards to health and attracts pests and vermin. A further advantage of this invention resides in the fact that the organic combustible refuse and also the organic combustible sewage may be used as a part of the fuel in the operation of power plants or similar installations. A still further advantage of this invention resides in the combustible refuse being transported through existing pipeline networks to a sewage disposal station for disposal by combustion with the organic sewage.

It is, therefore, a primary object of this invention to provide a system for waste disposal whereby the distance required to transport the waste material with haulage vehicles is substantially reduced.

Another object of this invention is to provide a system for waste disposal whereby the organic combustible refuse material is separated from the inorganic noncombustible refuse at conveniently located preparation plants and the combustible refuse is thereafter transported in the form of a slurry through underground pipelines to a disposal station.

A further object of this invention is to provide a system for waste disposal whereby the organic refuse is combined with the sewage and transported as a slurry through underground pipelines to a disposal station.

These and other objects and advantages of this invention will be more completely disclosed and described in the following specification, the accompanying drawings and the amended claims.

In the drawings:

FIGURE 2 is a flow diagram illustrating the steps of treating the refuse in the preparation plant to separate the combustible refuse from the noncombustible refuse and preparing a slurry from the combustible refuse and transporting the slurry to a disposal station.

FIGURE 3 is a flow diagram of a disposal station that includes a combustion installation and the manner of treating the slurry to burn the same in the combustion installation.

FIGURE 4 is a view similar to FIGURE 1 diagrammatically illustrating the preparation plants connected to the main sewage pipelines and the disposal station for the sewage and combustible refuse transported as a slurry from the preparation plants.

FIGURE 5 is a flow diagram similar to FIGURE 2 that illustrates the manner in which the combustible refuse is admixed with sewage and the water utilized to transport the sewage to form a slurry and the transportation of the slurry to the disposal station.

FIGURE 6 is a flow diagram similar to FIGURE 3 illustrating in detail the manner in which the slurry of sewage and combustible refuse is treated at the disposal station.

Figure 1:
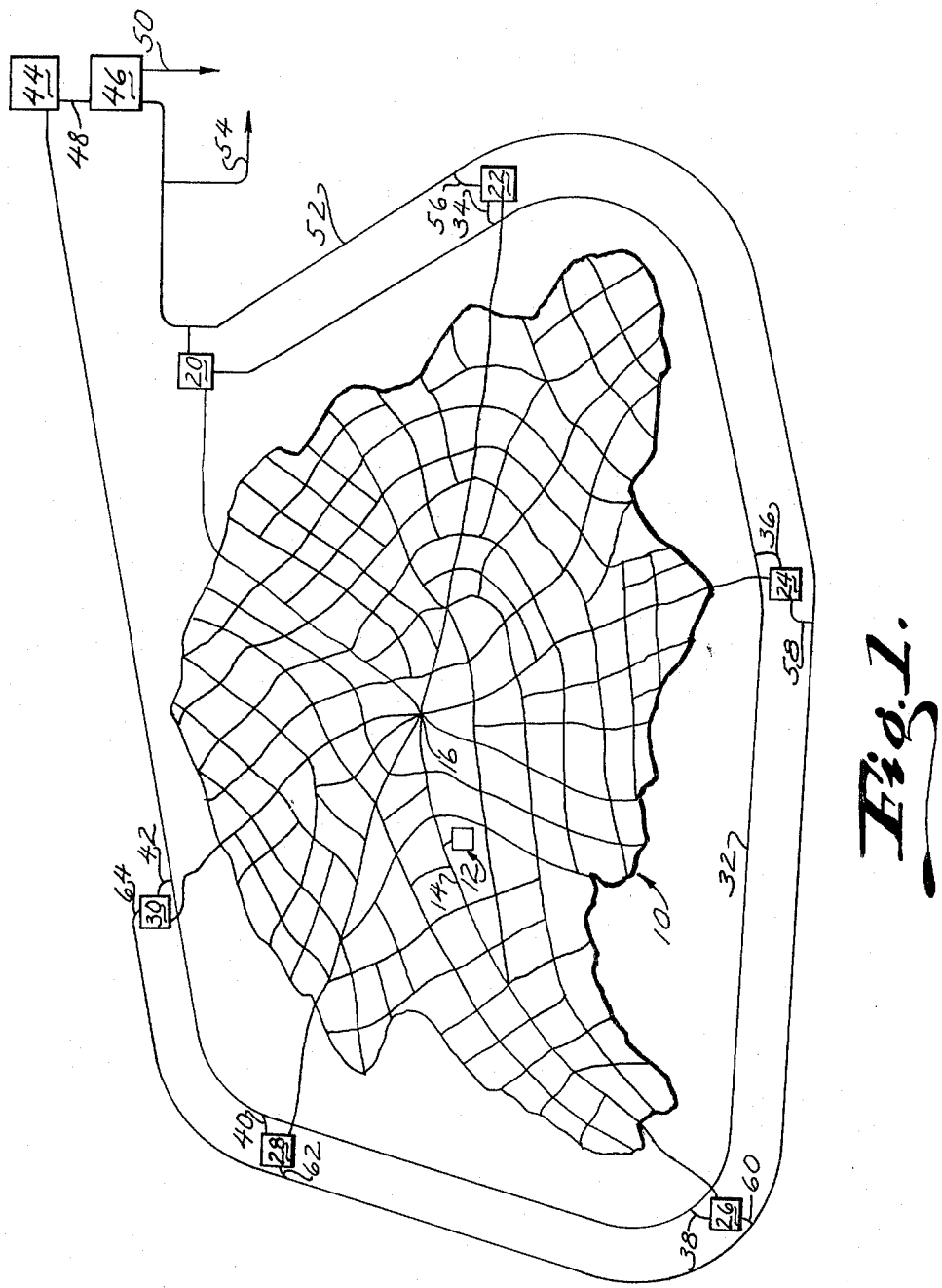
FIGURE 1 is a diagrammatic illustration of a waste collection area having preparation plants located peripherally thereabout and a disposal station located remotely therefrom.

Throughout the specification the terms "combustible refuse and organic refuse" will be used interchangeably to designate refuse or waste material that may be burned when subjected to elevated temperatures. It should be understood, however, that the combustible refuse may contain a limited amount of noncombustible constituents that do not interfere substantially with the combustion of the combustible components contained therein. The terms "noncombustible or inorganic refuse" are intended to designate waste materials that have such a high content of inorganic materials that they are not subject to thermal decomposition at substantially elevated temperatures. The noncombustible waste materials, as for example, stone, slate, rock, metal and the like, have a high specific gravity; whereas the combustible materials, such as food wastes, paper, wood, plastics and the like, have a relatively low specific gravity. As will be described in greater detail hereafter, a substantial portion of the inorganic noncombustible refuse may be separated from the combustible refuse by gravity separation so that the combustible and noncombustible refuse may be separately treated.

The combustible refuse may be admixed with a carrier liquid, such as water, to form a solids-water slurry having a predetermined solids concentration. The solids, in the combustible refuse particles, will remain suspended in the liquid carrier as the slurry is transported through a pipeline at a preselected velocity. It is thus possible to utilize water as a carrier liquid for the combustible refuse and the combustible refuse may thus be transported through a pipeline as a slurry in a manner similar to the transportation of a coal in water slurry as is described, for example, in United States Patents No. 2,791,471 and No. 3,073,652 assigned to the assignee of the present invention.

Referring to FIGURE 1 there is diagrammatically illustrated an urban area generally designated by the numeral 10. Within the urban area 10 relatively large volumes of waste material accumulate daily and must be removed therefrom. The crossing lines within the area 10 are intended to designate the principal roads or streets within the urban area 10 that must be traversed by haulage vehicles transporting the waste material. For example, haulage vehicles transporting waste material from an industrial installation 12 would follow the road 14 to the nearest preparation plant, in this instance the preparation plant designated by the numeral 26. The geographic center of the urban area 10 is indicated by the numeral 16.

Positioned around the perimeter of the area 10 are a plurality of preparation plants 20, 22, 24, 26, 28 and 30.

Although the preparation plants are illustrated as being located outside of the urban area 10, it should be understood that the preparation plants could, with equal facility, be located within the area 10 or at any suitable location for optimum waste collection. A slurry pipeline 32 is connected at one end to preparation plant 20 and extends around the urban area 10 and terminates at a disposal station 44. Each of the preparation plants 22, 24, 26, 28 and 30 are connected to the pipeline 32 by branch conduits 34, 36, 38, 40 and 42 so that the slurry pipeline 32 connects all of the preparation plants 20–30 with a disposal station 44 that is preferably located a substantial distance from the urban area 10. The disposal station 44 may, as will later be described, be a conventional power plant for generating electricity or it may be a combustion installation designed specifically to thermally decompose the combustible waste material. Illustrated diagrammatically adjacent the disposal station 44 is a water treating installation 46 that is connected to the disposal station 44 by a pipeline 48. Thus the water removed from the slurry in the disposal station 44 may be fed to the water treating installation 46 where it is clarified and purified and thereafter fed to adjoining rivers or streams through pipeline 50.

A water pipeline 52 is connected at one end to the pipeline 48 and extends around the urban area 10 and terminates at the preparation plant 30. A separate supplemental source of water indicated by the pipeline 54 may be connected to the water supply pipeline 52 to supply any make up water required. It should be understood that suitable pumping stations, valving and control devices are provided in both the slurry pipeline 32 and the water pipeline 52 to obtain the hereinafter described flow of both the slurry and water. The valves and control devices have been omitted from the drawing to more clearly illustrate the invention. Branch conduits 56, 58, 60, 62 and 64 connect the water pipeline 52 with the respective preparation plants 20–30 to provide a supply of water to the preparation plants for admixture therein with the combustible refuse to form a solids-water slurry of predetermined solids concentration.

The waste material is gathered from the business, industrial and residential buildings within the urban area 10 and transported by means of the main roads or arteries to the nearest preparation plant. For example, refuse from industrial installation 12 is transported by means of road 14 to the preparation plant 26 where it is treated as will hereinafter be described. With this arrangement, the maximum distance for the vehicles transporting the refuse material is equal to the distance from the geographic center of the urban area 10 to the nearest preparation plant. In comparison, without the preparation plants 20–30 it would be necessary for the haulage vehicles to travel from the industrial installation 12 through the urban area 10 to the disposal station 44 remotely located therefrom. The distance that the haulage vehicle must travel to discharge the refuse is reduced substantially by the invention herein described.

At the preparation plant, as for example preparation plant 26, the refuse material is processed as is indicated in the flow diagram of FIGURE 2. The haulage vehicle deposits the refuse in a receiver where the refuse is subjected to a shredding operation by means of suitable crushers or shredding devices, as for example a large industrial type of shredding device. After the refuse has been shredded and separated, it is subjected to magnetic separation where the relatively large magnetic scrap constituents are separated from the remainder of the refuse. The metallic scrap separated from the refuse may be collected at the preparation plants and used as a source of scrap metal. The refuse is thereafter comminuted by means of large industrial crushers and the solid friable material in the refuse is reduced to a preselected size spectrum. The comminuted refuse may again be subjected to magnetic separation to remove the metallic scrap that has been exposed by the previous comminution in the industrial crushers.

The comminuted refuse is thereafter subjected to a gravity separation wherein the refuse is separated into two components. One of these components, i.e. the heavier component, contains the inorganic noncombustible refuse, such as slate, rock, cement, mortar, plaster, sand, glass, earth and the like. The other lighter component contains organic combustible materials, such as garbage or food waste, wood, fiberboard, paper, synthetic resins and the like. The gravity separation of the refuse may be accomplished by means of conventional gravity separation devices, such as pneumatic tables, pneumatic separators, jigs, washing troughs, heavy media separators, cone type separators and the like. In certain of the gravity separation processes the solid materials are admixed with the water before gravity separation is accomplished. Thus, by means of a gravity separation the combustible refuse particles are separated from the noncombustible refuse particles.

The combustible refuse particles are thereafter admixed with water in a suitable receiver to form a solids-water slurry having a preselected solids concentration. For example, where the solids having gravity of about 1.3, solids concentration of 50% by weight is suitable for transportation through a pipeline. Suitable controls may be provided within the preparation plant 26 to adjust the solids concentration of the slurry according to the specific gravity of the combustible refuse particles. The slurry is then introduced into the pipeline 32 through the branch conduit 38 connecting the preparation plant 26 with the slurry pipeline 32. Suitable pump means are provided within the preparation plant 26 to feed the slurry through conduit 38 into the slurry pipeline 32 and maintain the flow of the slurry within the pipeline 32 at a predetermined minimum velocity, as for example between 4 and 6 feet per minute. The conduit 60 from water pipeline 52 may be connected within preparation plant 26 to conduit 38 to supply water thereto and maintain a relatively constant flow of fluid within the pipeline 32 to thereby transport the slurry to the disposal station 44. Suitable check valve means are also provided in the respective conduits 34–42 to limit the direction of the slurry from the preparation plants into the slurry pipeline 32. With this arrangement, the slurry of combustible refuse is transported from the respective preparation plants 20–30 through the slurry pipeline 32 to the disposal station 44 located remotely therefrom. It should be understood that other pipeline configurations could be used with equal facility, as for example a pair of pipe line circuits encircling the urban area 10, one pipeline circuit for the slurry and the other pipeline for the water that is admixed with the combustible refuse.

The inorganic or noncombustible refuse may be used for road building material or disposed of as a sanitary fill. The bulk or volume of the inorganic or noncombustible refuse is, however, substantially smaller than the bulk or volume of the refuse as it is gathered in the urban area 10 so that even if it is necessary to transport the noncombustible refuse a substantial distance, fewer haulage trips are required when compared with the transporting of the refuse containing both combustible and noncombustible constituents.

FIGURE 3 illustrates the manner in which the slurry is treated at the disposal station 44. The slurry is collected in a suitable receiver and is dewatered by means of either decanting, filtration, drying or the like. The dewatered combustible refuse is then preferably fed to a combustion unit where the combustible refuse is burned. The water removed from the slurry may be transported to a water treating installation 46 where the water is clarified and chemically treated and thereafter permitted to flow into adjoining streams or rivers. The water recovered from the dewatering process may be fed directly into the water pipeline 52 and pumped to the preparation plants for use in preparation of the slurry within the preparation plants. Although not illustrated in FIGURE 3, the disposal station may include a conventional power plant utilized for generating electricity used in the urban area 10. The combustible refuse may be fed directly to the combustion apparatus for combustion therein or may be first admixed with a carbonaceous fuel, such as coal or the like, and thereafter fed to the combustion apparatus.

Where desired, the slurry entering the disposal station 44 may be concentrated to increase the solids concentration by means of decanting, filtering or the like and the concentrated slurry, as for example a slurry having 75% solids concentration, may be transported as a slurry directly to the combustion apparatus where it is burned either independently or as an admixture with a carbonaceous fuel. The organic combustible refuse has relatively high B.t.u. content and during combustion contributes to the heat energy requirements of the power plant for generating electricity. On the other hand, it is within the scope of the herein described invention to transport the combustible refuse in the form of a slurry to a remotely located disposal station where the combustible refuse is disposed by means of thermal decomposition in a combustion unit designed specifically for the combustion of combustible refuse.

Referring to FIGURE 4 which is similar in many respects to FIGURE 1 and illustrates the main trunk lines 66 of the sewage system within the urban area 10. Because of elevations and terrain the sewage trunk line network is interconnected to a main sewage line 68 that is adapted to transport the sewage into the disposal station 44. The sewage trunk line network where feasible because of elevation and terrain may be connected to the preparation plants 20–30. For illustrative purposes the sewage trunk line 68 is connected to preparation plant 20 by pipeline 70 and a portion of the sewage network is connected to preparation plant 22 by pipeline 72. Similarly, the preparation plants 24, 26, 28, and 30 are also connected to the network by the lines 74, 76, 78 and 80. It should be understood, however, that the slurry pipeline 32, illustrated in FIGURE 4, could also be a portion of the sewage network and utilize and transport the slurry of combustible refuse and sewage to the disposal station 44.

In the embodiment illustrated in FIGURE 4, the refuse is transported to the preparation plants as has been previously described in respect to FIGURE 1. In the preparation plant the refuse is treated as is indicated in the flow diagram of FIGURE 5, in substantially the same manner as previously described in that the refuse is shredded, subjected to magnetic separation and comminution. The comminuted refuse is separated into a noncombustible component and a combustible component by means of gravity separation. The combustible component is admixed with the sewage flowing through conduit 76 into preparation plant 26, for example, and water supplied through the make up water pipeline 52 to obtain a slurry of sewage, combustible refuse and water having a predetermined solids content. The slurry is pumped through the slurry pipeline 32 which may be a portion of the sewage pipeline network and transported to the disposal station 44.

At the disposal station 44 the slurry may be treated, as is illustrated in the flow diagram of FIGURE 6, in a manner similar to that previously described in reference to FIGURE 3 and the excess water subjected to clarification and chemical treatment and a portion of the water recycled through the make up water pipeline 52. In the embodiment illustrated in FIGURE 4, it may be desirable to treat all of the water flowing through conduit 48 from disposal station 44 and circulate treated water through the water pipeline 52.

It will be apparent with the embodiment illustrated in FIGURES 4, 5 and 6, that presently existing sewage facilities may be employed in whole or in part to transport the slurry of refuse, sewage and water to the disposal station. The embodiment illustrated in FIGURE 1 may also utilize the sewage network as all or part of the slurry pipeline 32 to thereby reduce the overall costs of the pipeline installation for transporting the slurry of combustible refuse and water.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A system for disposing of waste material in a city comprising the steps of
    transporting refuse containing both combustible refuse and non-combustible refuse from various sources in said city to a preparation plant by haulage vehicles,
    comminuting said refuse in said preparation plant to obtain a preselected size spectrum,
    separating at least a portion of the metallic constituents from said refuse in said preparation plant,
    thereafter subjecting said comminuted refuse in said preparation plant to a gravity separation to thereby separate a substantial portion of the non-combustible refuse from the combustible refuse,
    admixing in said preparation plant the comminuted combustible refuse having said preselected size spectrum with a liquid to form a slurry having a preselected solids concentration,
    pumping the slurry from said preparation plant through a pipeline at a sufficient velocity to maintain said comminuted combustible refuse suspended in said liquid and to transport said combustible refuse through said pipeline to a disposal station located remotely from said preparation plant,
    removing at least a portion of the liquid from said slurry at said disposal station, and
    thereafter burning said combustible refuse transported to said disposal station as a slurry.

2. A system for disposing of waste material in a city as set forth in claim 1 in which,
    said liquid includes sewage and water.

3. A system for disposing of waste material in a city as set forth in claim 1 which includes,
    admixing the combustible refuse with sewage and water to form a slurry,
    transporting the slurry through a pipeline to a disposal station, and
    burning the combustible refuse and sewage at the disposal station.

4. A system for disposing of waste material in a city as set forth in claim 1 which includes,
    separating the combustible refuse from said liquid at said disposal station,
    drying said combustible material, and
    burning said dried combustible refuse.

5. A system for disposing of waste material in a city as set forth in claim 1 which includes,
    admixing said slurry having a portion of the liquid removed therefrom with a carbonaceous fuel, and
    burning said admixture in a conventional carbonaceous fuel burning apparatus.

6. A system for disposing of waste material in a city as set forth in claim 1 which includes,
    recycling said liquid to said preparation plant for admixture with said combustible refuse.

References Cited

UNITED STATES PATENTS

| | | | |
|---|---|---|---|
| 2,116,573 | 5/1938 | Harrington | 110—15 |
| 3,159,353 | 12/1964 | Atwater | 110—8 |
| 3,304,894 | 2/1967 | Cox et al. | 110—15 |

JAMES W. WESTHAVER, *Primary Examiner.*